Patented Aug. 4, 1936

2,049,806

UNITED STATES PATENT OFFICE 2,049,806

CARBURIZATION OF FERROUS METALS

Donald A. Holt, Niagara Falls, N. Y., assignor to E. I. du Pont de Nemours & Company, Incorporated, Wilmington, Del., a corporation of Delaware No Drawing. Application March 10, 1933, Serial No. 660,278

28 Claims. (Cl. 148—15)

This invention relates to the case-hardening of iron and steel, and more particularly to a case-hardening process utilizing a bath of fused salts.

A number of case-hardening processes have been proposed or are in use which comprise immersing iron or steel articles in a bath of fused salt to which case-hardening properties have been imparted, by adding thereto one of various inorganic cyanogen compounds. The addition agents or "activators" commonly used or proposed for this purpose are alkali metal cyanides, alkaline earth metal cyanides, and calcium cyanamide.

One of the most common fused salt case-hardening baths comprises a mixture containing 20% or more of an alkali metal cyanide, e. g. sodium cyanide and other alkali metal salts such as sodium chloride and/or sodium carbonate. This type of bath, which is usually operated between 800 and 900° C., produces a mixed case, i. e. it introduces both carbon and nitrogen into the iron or steel being treated. In this process the carburizing and nitriding effect are approximately equal in most cases and, while a relatively shallow case is produced, the amount of nitrogen introduced is such that the article treated acquires a high degree of surface hardness when quenched.

Another class of case-hardening salt baths comprises those containing substantial amounts of alkaline earth metal salt, activated by adding thereto one of the aforementioned inorganic cyanogen compounds. An example of this type of bath is a fused salt mixture of sodium chloride and 50% or more of calcium chloride which is activated by the addition of calcium cyanide or calcium cyanamide. Baths of this type are characterized by having mainly a carburizing effect similar to that obtained by pack hardening operations, the amount of nitrogen introduced being relatively small, and by producing a relatively deeper case than the alkali metal cyanide baths described above. Articles cemented in this bath may be hardened by suitable heat treatment, for instance by quenching from a suitable temperature. These carburizing baths have certain disadvantages which have restricted their commercialization. During the course of operation, the alkaline earth metal salts present are slowly changed to the corresponding oxide, for example calcium oxide. These oxides have a limited solubility in the bath and the result of this is that first the viscosity of the bath is increased to an undue extent and finally the oxide precipitates out to form a sludge in the bottom of the treating vessel. This oxide sludge tends to adhere to articles treated in the bath if they are inadvertently immersed too deeply, thus preventing uniform cementation. Furthermore, the sludge in the bottom of the treating vessel acts as an insulating layer which often causes the bottom of the vessel to be overheated and consequently burned out, unless a special type of furnace is utilized which allows the vessel to be heated on the sides only. At intervals of time, the case-hardening operation must be interrupted while the sludge is removed from the bottom of the vessel. Another disadvantage inherent in these carburizing baths is that the addition of the inorganic activators results in a change in the ratio of the various metallic constituents of the salts which make up the mixture being used. For example, if a salt bath consisting of a definite ratio of sodium chloride and calcium chloride is used and this is activated by adding thereto calcium cyanide, the addition of the calcium compound over an extended period of operation finally results in a higher proportion of calcium compounds than was originally present in the bath. This is disadvantageous because the case-hardening activity of the bath depends to a considerable extent upon the concentrations of alkaline earth metal salt, in this case calcium salt, present in the bath. Furthermore, in general, this change in salt ratio in the bath usually results in a change in the melting point thereof. If the change in salt ratio causes an increase in the melting point, efficient operation of the process may be seriously interfered with, due to the bath becoming too viscous. To avoid this change in salt ratio, a certain amount of the original salt mixture is usually added along with the activating compound. However, this method does not wholly overcome the disadvantage because the correct amount of salt to add in this manner cannot be determined except by making frequent chemical analyses of the bath, which is difficult and impracticable. Hence, for practical operation of these baths, in view of this salt ratio change and because of sludge formation, it is necessary periodically to discard part or all of the bath and replace it with a fresh mixture.

An object of this invention is to provide such a process wherein the salt composition of the bath will remain substantially constant over long periods of operation, and in which there will be substantially no precipitation of infusible material or change in melting point. A further object is to provide an improved fused salt bath case-hardened process in which the carburizing effect predominates. Other objects will be apparent hereinafter.

These objects are attained in accordance with my invention by imparting case-hardening activity to fused salt baths by adding thereto organic nitrogen compounds.

I have discovered that iron and steel articles can be carburized to an extent equal to or better than that obtained by the fused salt bath processes heretofore known, by treating them in a fused salt bath to which has been added an organic nitrogen compound. If an organic nitrogen compound is selected which contains substantially no metallic constituent, the addition thereof to the fused salt bath produces no change in the ratio of metal constituents in the bath. This results in a bath of constant melting point and constant case-hardening activity and enables the bath to be used for an indefinite period of time without replacement.

I have further discovered that my method of imparting case-hardening activity does not result in the formation of any substantial amount of infusible materials such as alkaline earth metal oxides, even when the bath contains substantial amounts of alkaline earth metal salts. Hence, when operating in accordance with my invention, the viscosity of the bath remains substantially constant and there is no precipitation of insoluble materials.

In one method of practicing my invention I utilize a fused mixture containing one or more alkaline earth metal salts and one or more alkali metal salts. Case-hardening properties are imparted to this mixture of fused salts by adding thereto an organic nitrogen compound which may be in the liquid, solid, or gaseous form. For ease in handling and to avoid expensive and elaborate equipment, I prefer to use a solid organic compound for this purpose. The material may be a powder granule or in the form of lumps or pellets of solid material. It is convenient to prepare the solid organic activator in the form of pellets or cakes having a definite weight, since this enables the operator to know exactly how much material he is adding to the bath without having to weigh it out. Furthermore, less of the activating compound is required if used in pellet form, since there is often an appreciable loss due to volatilization and thermal decomposition if granular or powdered material is used. The temperature of the fused bath is preferably held fairly constant at some temperature between about 700° C. and 950° C. In most cases, I prefer to operate at a temperature range between 800–900° C.

When my fused salt bath is first prepared or when it has been remelted after a period of inactivity, the first additions of the organic nitrogen compound cause excessive foaming and scum formation. During this period of excessive foaming and scumming, the case-hardening activity of the bath is relatively low and non-uniform. I prefer to continue adding organic nitrogen compound to the bath as often as necessary until this period of excessive foaming and scumming has ceased, which usually requires from one to three hours. When the addition of a small amount of the activator causes substantially no further excessive foaming, the scum which has formed is skimmed off the surface and the bath is then ready for operation; and from thence onward will produce uniform and excellent case-hardening results.

During the regular operation of the bath, the organic nitrogen compound is added in such quantities and as often as necessary to maintain the bath at full case-hardening activity. The case-hardening activity of the bath may be judged by the operator by the observance of the surface of the bath. When the bath is at full case-hardening activity, the surface of the bath is covered with a continual succession of small popping flames over the entire surface. These flames appear to be caused by bubbles of inflammable gases which are continually rising to the surface of the bath and which ignite upon contact with the air. By the appearance of these flames the experienced operator can observe any decrease in case-hardening activity and thereupon will add a further quantity of the organic nitrogen compound. My preferred method of maintaining the bath in an active state is to add a definite amount of the activating agent each time a batch of work is placed in the bath. The amount of the activator so added may be varied, depending on the extent of the surface to be case-hardened and the length of time allotted for the treatment. The amount of activator to be added will also depend upon the nature of the organic nitrogen compound used. In general, each addition will be equivalent to 0.1 to 2.0% of the weight of the bath, although in some cases, the amount may be outside of this range. A salt bath activated in accordance with my invention will retain its full case-hardening activity for a considerable period of time, e. g. several hours; this will depend to some extent upon the particular organic nitrogen compound used and other factors such as temperature and the amount of work treated.

Periodic replenishment of the bath, to compensate for material removed by adhering to the work, may be accomplished by adding sufficient of the original salt mixture, without regard to the amount of activator which has been added.

The articles to be treated are immersed in the bath for a definite period of time and then may be removed and heat treated as desired, for example by quenching. The time of treatment will vary, depending upon the degree of carburization desired. For most purposes I have found that a period of treatment of from one to two hours gives very satisfactory results. Where an especially deep case or a case having a high carbon content is desired, the treatment may be extended to five or six hours. For some purposes a 20–30 minute treatment is ample.

The following examples will illustrate more specifically various methods of carrying out my invention:

EXAMPLE I

Hydrocyanic acid was polymerized by heating in the presence of ammonia by a modification of the method described by Walker and Eldred, Industrial and Engineering Chemistry, volume 17, pages 1074–1081 (October, 1925). The polymerized product was a black powder, resembling finely divided charcoal.

This HCN polymer was added to a molten salt bath consisting of 33 parts by weight of sodium chloride and 67 parts by weight of calcium chloride to the extent of 2% by weight of the bath during the first one-half hour and 1% by weight of the bath one hour later, the temperature of the bath being maintained at about 850° C. The bath was then in a fairly active state.

Bars of plain carbon steel were treated by immersing them in the activated bath for varying periods of time and at different temperatures.

The extent of case-hardening obtained was measured by cutting successive 0.004 inch layers of metal from the treated bars by means of a lathe, and separately analyzing the cuttings from each layer for carbon and nitrogen. In some cases, the bars were fractured and the visual case depth measured. Some of the bars also were tested for hardness in the Rockwell machine after quenching in oil or in water.

The results obtained are tabulated below:

Series A

Bars of S. A. E. 1020 steel were treated for one hour at different temperatures. The bath was maintained at high activity by the addition of the HCN polymer as the work progressed; the average addition was about 0.5% of the weight of the bath.

| Run No. | 1 | | 2 | | 3 | | 4 | |
|---|---|---|---|---|---|---|---|---|
| Temperature | 845° C. | | 900° C. | | 930° C. | | 950° C. | |
| Case analysis | % C | % N | % C | % N | % C | % N | % C | % N |
| 1st 0.004 cut | 0.82 | 0.74 | 1.00 | 0.48 | 1.06 | 0.41 | 1.13 | 0.42 |
| 2nd 0.004 cut | 0.67 | 0.38 | 0.80 | 0.34 | 0.97 | 0.35 | 1.07 | 0.35 |
| 3rd 0.004 cut | 0.35 | 0.08 | 0.57 | 0.22 | 0.71 | 0.26 | 0.83 | 0.27 |
| 4th 0.004 cut | 0.21 | 0.02 | 0.44 | 0.11 | 0.66 | 0.21 | 0.61 | 0.20 |
| 5th 0.004 cut | | | 0.27 | 0.08 | 0.43 | 0.12 | 0.53 | 0.13 |
| 6th 0.004 cut | | | | | 0.29 | 0.07 | 0.42 | 0.11 |
| 7th 0.004 cut | | | | | 0.22 | 0.07 | 0.26 | 0.09 |
| 8th 0.004 cut | | | | | | | 0.22 | 0.05 |

Discs of S. A. E. 1020 steel treated in the bath at 900° C. for one hour and quenched in oil were found to have a surface hardness of 59 Rockwell C units; discs so treated but quenched in water attained a hardness of 62 Rockwell C units.

Series B

Bars of S. A. E. 1020 steel treated at 900° C. for varying periods of time. At the start, four bars were immersed in the bath at once, and a bar was removed at the end of the 1st, 2nd, 3rd, and 6th hour. The simultaneous introduction of the four bars caused the bath temperature to range from 775 to 890° C. during the first half-hour; the temperature thereafter was maintained close to 900° C. The activity of the bath was maintained by adding 0.5% of the weight of the bath of powdered HCN polymer as required; during six hours of operation, 2–3% of the bath weight of the polymer was added.

| Time of treatment | 1 hour | | 2 hours | | 3 hours | | 6 hours | |
|---|---|---|---|---|---|---|---|---|
| Case analysis 0.004 inch cuts | % C | % N | % C | % N | % C | % N | % C | % N |
| Cut No. 1 | 0.94 | 0.50 | 1.20 | 0.46 | 1.64 | 0.45 | 2.00 | 0.36 |
| 2 | .76 | .36 | 0.91 | .43 | 1.10 | .46 | 1.11 | .39 |
| 3 | .58 | .16 | .83 | .36 | .93 | .40 | 1.07 | .37 |
| 4 | .27 | .09 | .65 | .24 | .79 | .30 | 0.97 | .33 |
| 5 | .22 | .03 | .57 | .14 | .69 | .24 | .89 | .30 |
| 6 | | | .44 | .10 | .52 | .14 | .80 | .26 |
| 7 | | | .32 | .04 | .43 | .06 | .71 | .22 |
| 8 | | | .22 | .03 | .31 | .04 | .64 | .17 |
| 9 | | | | | .27 | .03 | .53 | .16 |
| 10 | | | | | .22 | | .45 | .09 |
| 11 | | | | | | | .38 | .04 |
| 12 | | | | | | | .31 | .04 |
| 13 | | | | | | | .25 | .02 |
| 14 | | | | | | | .22 | .02 |

Series C

Machine bolts of S. A. E. 1112 steel treated for various periods of time at 845° C. and 900° C. and quenched in water. The case depth was determined by measuring the depth of the white case appearing in transverse cross-sections of the treated bolts after quenching. During the treatment HCN polymer was added to the bath as required; the total amount of polymer added during the 6 hours of operation was equivalent to about 2% of the weight of the bath.

Case depths

| Temperature | Time of treatment | | | | |
|---|---|---|---|---|---|
| | ¼ hour | ½ hour | 1 hour | 2 hours | 3 hours |
| 845° C | | 0.007 in. | 0.011 in. | 0.015 in. | 0.019 in. |
| 900° C | 0.005 in. | 0.009 in. | 0.015 in. | 0.023 in. | |

Example II

Two case-hardening baths were made by fusing together strontium chloride and sodium chloride in different proportions, and activating by the addition of powdered HCN polymer as in Example I. Bars and discs of S. A. E. 1020 steel were treated in these baths at 900° C. and the case depths determined by analysis of 0.004 inch cuttings as in Example I.

Series A

Per cent by weight
Bath composition, strontium chloride_____ 70
Bath temperature 900° C., sodium chloride____ 30

| Time of treatment | 1 hour | | 4 hours | | 6 hours | |
|---|---|---|---|---|---|---|
| Case analysis | % C | % N | % C | % N | % C | % N |
| Cut No. 1 | 0.82 | 0.65 | 1.67 | 0.42 | 1.88 | 0.36 |
| 2 | 0.89 | 0.47 | 1.02 | 0.44 | 1.06 | 0.41 |
| 3 | 0.63 | 0.26 | 0.95 | 0.40 | 0.99 | 0.37 |
| 4 | 0.50 | 0.15 | 0.84 | 0.42 | 0.95 | 0.34 |
| 5 | 0.30 | 0.06 | 0.70 | 0.32 | 0.84 | 0.30 |
| 6 | 0.23 | | 0.58 | 0.24 | 0.74 | 0.24 |
| 7 | | | 0.48 | 0.15 | 0.63 | 0.24 |
| 8 | | | 0.36 | 0.11 | 0.54 | 0.19 |
| 9 | | | 0.29 | 0.08 | 0.46 | 0.14 |
| 10 | | | 0.25 | | 0.36 | 0.11 |
| 11 | | | 0.22 | | 0.27 | 0.09 |
| 12 | | | | | 0.23 | |

Series B

Per cent by weight
Bath composition
Strontium chloride_____ 58
Sodium chloride_____ 42

| Treatment | 1 hour at 900°C. | |
|---|---|---|
| Case analysis | % C | % N |
| Cut No. 1 | 0.91 | 0.15 |
| 2 | 0.89 | 0.13 |
| 3 | 0.71 | 0.12 |
| 4 | 0.53 | 0.07 |
| 5 | 0.29 | 0.05 |
| 6 | 0.22 | 0.04 |

Hardness tests on disc samples after water-quenching:

61–62 Rockwell C units
614–620 Vickers-Brinnel units

Example III

A fused bath consisting of 77% by weight of barium chloride, 13% by weight of potassium chloride, and 10% by weight of sodium chloride was activated at 900° C. with HCN polymer powder as in Example I. Samples of S. A. E. 1020 steel were treated in the bath for one hour at 900° C. with the following results:

| Case analysis (0.004 inch cuts) | % C | % N |
|---|---|---|
| Cut No. | | |
| 1 | 0.90 | 0.13 |
| 2 | 0.88 | 0.10 |
| 3 | 0.72 | 0.08 |
| 4 | 0.45 | 0.06 |
| 5 | 0.32 | 0.04 |

Hardness after water-quenching, 60.5 Rockwell C units.

Example IV

A fused mixture of equal parts by weight of barium chloride and calcium chloride was activated at 900° C. with HCN polymer as in Example I. A bar of S. A. E. 1020 steel treated in this bath for one hour gave the following case analysis (0.004 inch cuts):

| Cut No. | % C | % N |
|---|---|---|
| 1 | 1.35 | 0.49 |
| 2 | 1.06 | .39 |
| 3 | 0.80 | .28 |
| 4 | .55 | .12 |
| 5 | .27 | .10 |
| 6 | .22 | .09 |
| 7 | .22 | .06 |

Example V

A fused mixture consisting of 50 parts by weight of KCl and 50 parts by weight of NaCl was activated at 860° C. with HCN polymer as in Example I. The case analysis of a bar of S. A. E. 1020 steel treated in this bath for one hour was as follows:

| 0.004 inch | % C | % N |
|---|---|---|
| Cut No. | | |
| 1 | 0.62 | 0.35 |
| 2 | 0.26 | 0.28 |

Example VI

On heating dicyandiamide it breaks down into melam and melamine at a temperature very slightly over its melting point (203° C.). The melamine in turn breaks down into melam and ammonia. Melam, on further heating, loses ammonia giving melem and mellon. A substance, predominantly melam but containing small amounts of melem and mellon, was prepared by introducing successive small lots of dicyandiamide into an iron pot heated to about 300° C. The impure melam so obtained was a yellow solid which sublimed slowly at approximately 600° C.

The melam was used to activate salt baths composed of (A) sodium chloride and calcium chloride and (B) sodium chloride and strontium chloride. Bars of S. A. E. 1020 steel were treated in these baths for one hour at 900° C. and the case depth determined by analysis of 0.004 inch cuts as in the foregoing examples.

Series A

Bath composition — Per cent by weight

Calcium chloride ........................ 67
Sodium chloride ......................... 33

Activation: About 3% of the bath weight of melam added at the start to bring the bath to full activity; thereafter, during 3 hours of operation, a total of around 3% of the bath weight of the melam was added to the bath.

| Case analysis of treated bars (0.004 inch cuts) | % C | % N |
|---|---|---|
| Cut No. | | |
| 1 | 0.59 | 0.58 |
| 2 | 0.53 | 0.38 |
| 3 | 0.41 | 0.18 |
| 4 | 0.29 | 0.07 |
| 5 | 0.23 | 0.05 |
| 6 | 0.21 | 0.04 |
| 7 |  | 0.03 |

Series B

Bath composition (per cent by weight)

| Bath | No. 1 | No. 2 |
|---|---|---|
|  | Percent | Percent |
| Strontium chloride | 60 | 80 |
| Sodium chloride | 40 | 20 |

Activation: Same as in Series A.

| Case analysis of treated bars (0.004 inch cuts) | 60% SrCl₂ | | 80% SrCl₂ | |
|---|---|---|---|---|
|  | % C | % N | % C | % N |
| Cut No. | | | | |
| 1 | 0.79 | 0.26 | 1.06 | 0.22 |
| 2 | .76 | .21 | 0.94 | .21 |
| 3 | .63 | .12 | .77 | .14 |
| 4 | .38 | .08 | .48 | .12 |
| 5 | .25 | .06 | .29 | .10 |
| 6 | .21 | .04 | .23 | .10 |

Example VII

A 67% CaCl₂–33% NaCl fused bath was activated with oxamide which was prepared as follows:

Diethyl oxalate was shaken with an equal volume of water and to this mixture were made successive additions of strong aqua ammonia with cooling. The resultant oxamide was filtered off, washed with water, and dried at 100° C.

It was necessary to add 2% of the weight of the bath of the oxamide in order to produce the desired case-hardening activity at 900° C.

A bar of S. A. E. 1020 steel was treated in the bath for one hour at 900° C. and during this period, about 2% of the bath weight of the oxamide was added to the bath. The treated bar gave the following case analysis:

| 0.004 inch | % C | % N |
|---|---|---|
| Cut No. | | |
| 1 | 0.64 | 0.59 |
| 2 | .48 | .40 |
| 3 | .41 | .21 |
| 4 | .30 | .18 |
| 5 | .22 | .09 |

Example VIII

A 67% CaCl₂–33% NaCl melt was activated by the addition of about 7% of the bath weight of hexamethylenetetramine. A bar of S. A. E. 1020 steel, treated in this bath at 900° C. for one hour gave the folowing case analysis:

| 0.004 inch | % C | % N |
|---|---|---|
| Cut No. | | |
| 1 | 0.67 | 0.78 |
| 2 | .51 | .51 |
| 3 | .44 | .25 |
| 4 | .29 | .11 |
| 5 | .22 | .03 |

My invention is not restricted to the use of the specific organic nitrogen compounds mentioned in the above examples. So far as I am aware, the addition of any organic nitrogen compound to a fused salt bath will impart case-hardening properties thereto. For example, organic cyanogen compounds, arylamines, alkyl amines, pyridine, acid amides, amino acids, and ammoniated organic substances, e. g. ammoniated peat are suitable for activating agents in accordance with my invention. I prefer to use an organic cyanogen compound as activating agent, for example hydrocyanic acid, a polymer thereof, cyanamide, a polymer of cyanamide, such as dicyanodiamide or organic cyanogen condensation products such as melam. In general, the best results are obtained by using a solid organic cyanogen compound compressed into pellets or cakes.

Preferably, I employ organic nitrogen compounds which do not detonate or explode when subjected to the operating temperature of the case-hardening bath. Such explosive compounds, if used, must be added in sufficiently small amounts or diluted with other organic compounds to avoid reactions of excessive violence.

I also prefer to use organic nitrogen compounds which contain little or no oxygen, since I have found that in general the compounds containing oxygen are not as efficient as oxygen-free compounds. However, my invention is not so restricted, since organic nitrogen compounds containing oxygen do activate the case-hardening bath.

Although any organic nitrogen compound will function as activator in my case-hardening process, obviously the degree of activation will vary, depending upon the physical and chemical characteristics of the compound and the manner in which it is applied. The selection of activating agent and the manner of applying it will depend upon the results desired, temperature of operation and other considerations such as the availability and cost of the activator.

The amount of organic nitrogen compound also is not restricted to the amounts stated in the above examples. As shown by these examples, various organic nitrogen compounds will impart case-hardening activities to the bath to a varying degree. Those compounds which are less active will be added to the bath in larger amounts and/or more often than the more active compounds. In general, I prefer to add the organic nitrogen compound to the bath in small amounts as the work progresses. This is because the addition of unduly large amounts of the organic nitrogen compound often results in an excessive amount of thermal decomposition and/or volatilization of the activating compound before it has an opportunity to enter into the bath and activate the same. Hence, for any given organic nitrogen compound there will be a maximum amount which may be added to the bath without undue loss by thermal decomposition. If desired, the more unstable or more volatile organic nitrogen compounds may be diluted with other organic compounds or with the salt or salt mixture of which the bath is composed. For example, pellets may be made by compressing a mixture of the organic nitrogen compound and the salt or salt mixture, and these pellets used to energize the bath. In some cases, it will be preferable to use a mixture of organic nitrogen compounds, with or without diluents. If desired, the activator may be added continuously.

When activating the bath by allowing a solid activator to float on the bath surface, I prefer to use an organic nitrogen compound having a relatively low volatility; the more volatile solid compounds are preferably immersed below the bath surface. Volatile liquids or gaseous organic nitrogen compounds may be used to activate the bath by introducing them below the bath surface by means of a tube or its equivalent.

If desired, my organic activators may be used in conjunction with inorganic activating agents or case-hardening compounds. For example, a case-hardening bath containing an alkali or alkaline earth metal cyanide may be further activated by adding thereto an organic nitrogen compound.

My invention also is not restricted to the spesific fused salt baths illustrated above, since any non-oxidizing fused salt or salt mixture which has a suitable melting point may be used. Substantial amounts of strongly oxidizing salts, e. g. nitrates, should be avoided, since these tend to corrode the treating vessel and the articles being case-hardened. For most purposes the halides and/or carbonates of the alkali metals: sodium, potassium and lithium, and the halides of the alkaline earth metals: calcium, barium, strontium, or various mixtures of these salts having suitable melting points, are to be preferred. I prefer to use salts of the alkaline earth metals or mixtures of these salts, for instance with alkali metal salts, in which the alkaline earth metal salts predominate. I have found that in general improved results are obtained if the salt mixture contains considerable amounts of the alkaline earth metal salt or salts, since these appear to increase the case-hardening activity, resulting in a higher carbon concentration in the case-hardened article and a greater depth of carbon penetration.

The best carburizing results may be obtained from my process by operating at temperatures above 700° C.; for example at temperatures between 700–950° C. However, my invention is not restricted to these temperature ranges, and where a high degree of carburization is not required, the process may be operated at temperatures between 500° C. and 700° C.

An important advantage of my invention over prior methods of case-hardening in fused salt baths resides in the fact that according to my process, the ratio of metallic constitutents in the fused bath remains substantially constant over long periods of operation. Hence, in operating my process it is only necessary to add such of the original salt mixture as may be necessary to replace that which has been removed by adhering to the treated articles leaving the bath, and it is never necessary to readjust the salt composition. Furthermore, the constancy of the bath composition makes possible practically indefinite use of the salt mixture without replacement other than periodic replenishment to compensate for the salt removed by adhering to the work. A further advantage of my process is that substantially no formation of insoluble materials occur.

For example, a bath consisting solely of one or more alkaline earth metal salts, or containing these salts in any proportions, may be operated according to my invention without causing the formation of any substantial amounts of alkaline earth oxide or carbonate. For this reason, the process may be operated continuously without interruption for the removal of insoluble material or without danger of overheating the treating vessel, due to formation of heat insulating oxide sludge.

The formation of insoluble oxide in prior case hardening baths is undoubtedly caused by decomposition of the inorganic cyanide and/or inorganic cyanide forming compound added as activator. The decomposition of the inorganic cyanogen compounds results in the formation of carbonates; if alkaline earth metal salts are present, their carbonates are formed and may decompose at the operating temperatures to form the insoluble oxides. In my herein described case-hardening process, since no inorganic cyanogen compounds are added, carbonates and oxides cannot be formed, except by the replacement of the negative radicals (e. g. chlorine) of the salts making up the bath. This, however does not occur. A fused bath consisting of 67% by weight of calcium chloride and 33% by weight of sodium chloride, was operated daily over a period of about 35 days (net operating time, 220 hours) to case harden steel articles according to my herein described invention, using HCN polymer and other organic nitrogen compounds as activators. During this period there was no evidence of chlorine displacement and no oxide or carbonate was formed in the bath. I have not determined the exact manner in which the organic nitrogen compound imparts case hardening properties to the bath. Since my organic activators, when added, float about on the bath surface and eventually disappear, it appears that they dissolve in the bath and then gradually decompose in some manner to give up carbon and nitrogen to the steel articles treated therein. It is to be understood, however, that my invention as set forth in the appended claims is not restricted to this explanation; it is conceivable that different organic nitrogen compounds may activate the bath by reason of different chemical reactions, although the net result is the same, namely case hardening properties are imparted to the bath.

My invention may be utilized to inhibit the decarburizing action of fused salt baths used for heat treating steel articles. Such baths, which commonly consist of alkali metal salts, alkaline earth metal salts or various mixtures of these, usually have a decarburizing action on steel treated therein; that is, steel treated in the bath tends to lose carbon at the surface or to some distance below the surface. This decarburizing action may be inhibited by adding to the bath an organic nitrogen compound. For this purpose I prefer to use a solid organic cyanogen compound, for example a solid polymer of hydrocyanic acid. The amount of organic nitrogen compound to be added will be less than that required for case hardening and may be varied according to the result desired. For example the amount may be adjusted so as to inhibit but not wholly prevent decarburization, to just neutralize the decarburizing effect or to produce a slight case hardening or carburizing action.

In this specification and in the appended claims the term "cementation" is used to designate a process whereby hardening elements e. g. carbon and nitrogen are introduced into the surface of a solid ferrous metal article. The term "organic cyanogen compound" is used in the specification and the appended claims to include cyanogen, hydrocyanic acid, cyanamide and all organic nitrogenous substances which may be made by polymerization and/or condensation of these compounds.

I claim:

1. A process for the cementation of ferrous articles comprising immersing said articles in a fused salt bath containing an alkaline earth metal salt to which case-hardening properties have been imparted by adding thereto a solid non-metallic organic cyanogen compound.

2. A process for the cementation of ferrous articles comprising immersing said articles in a fused salt bath containing an alkaline earth metal salt to which case-hardening properties have been imparted by adding thereto a polymer of hydrocyanic acid.

3. A process for the cementation of ferrous articles comprising immersing said articles in a fused salt bath comprising an alkaline earth metal halide and an alkali metal halide to which case-hardening properties have been imparted by adding thereto a polymer of hydrocyanic acid.

4. A process for the cementation of ferrous articles comprising immersing said articles in a fused salt bath comprising calcium chloride and sodium chloride to which case-hardening properties have been imparted by adding thereto a non-metallic organic cyanogen compound.

5. A process for the cementation of ferrous articles comprising immersing said articles in a fused salt bath comprising calcium chloride and sodium chloride to which case-hardening properties have been imparted by adding thereto a solid polymer of hydrocyanic acid.

6. A process for the cementation of ferrous articles comprising immersing said articles in a fused salt bath comprising calcium chloride and barium chloride to which case-hardening properties have been imparted by adding thereto a non-metallic organic cyanogen compound.

7. A process for the cementation of ferrous articles comprising immersing said articles in a fused salt bath comprising calcium chloride and barium chloride to which case-hardening properties have been imparted by adding thereto a polymer of hydrocyanic acid.

8. A method for imparting case-hardening properties to a fused salt bath comprising adding thereto a non-metallic organic nitrogen compound which is not explosive under the conditions of the process.

9. A method for imparting case-hardening properties to a fused salt bath comprising adding thereto a solid non-metallic organic cyanogen compound.

10. A method for imparting case-hardening properties to a fused salt bath containing an alkaline earth metal salt comprising adding to said bath a non-metallic organic nitrogen compound which is not explosive under the conditions of the process.

11. A method for imparting case-hardening properties to a fused salt bath containing an alkaline earth metal salt comprising adding to said bath a non-metallic organic cyanogen compound.

12. A method for imparting case-hardening properties to a fused salt bath comprising an alkaline earth metal halide and an alkali metal halide comprising adding to said bath a solid non-metallic organic cyanogen compound.

13. A fused salt bath to which case-hardening properties have been imparted by adding thereto a non-metallic organic nitrogen compound which it not explosive under the conditions of the process.

14. A fused salt bath to which case-hardening properties have been imparted by adding thereto a non-metallic organic cyanogen compound.

15. A fused salt bath containing an alkaline earth metal salt to which case-hardening properties have been imparted by adding thereto a non-metallic organic nitrogen compound which is not explosive under the conditions of the process.

16. A fused salt bath containing an alkaline earth metal salt to which case-hardening properties have been imparted by adding thereto a non-metallic organic cyanogen compound.

17. A fused salt bath containing an alkaline earth metal salt to which case-hardening properties have been imparted by adding thereto a non-metallic organic cyanogen compound.

18. A fused salt bath containing an alkaline earth metal salt to which case-hardening properties have been imparted by adding thereto a polymer of hydrocyanic acid.

19. A fused salt bath comprising an alkaline earth metal halide and an alkali metal halide to which case-hardening properties have been imparted by adding thereto a solid non-metallic organic cyanogen compound.

20. A fused salt bath comprising an alkaline earth metal halide and an alkali metal halide to which case-hardening properties have been imparted by adding thereto a solid polymer of hydrocyanic acid.

21. A fused salt bath comprising calcium chloride and sodium chloride to which case-hardening properties have been imparted by adding thereto a non-metallic organic cyanogen compound.

22. A fused salt bath comprising calcium chloride and sodium chloride to which case-hardening properties have been imparted by adding thereto a solid polymer of hydrocyanic acid.

23. A fused salt bath comprising calcium chloride and barium chloride to which case-hardening properties have been imparted by adding thereto a non-metallic organic cyanogen compound.

24. A fused salt bath comprising calcium chloride and barium chloride to which case-hardening properties have been imparted by adding thereto a solid polymer of hydrocyanic acid.

25. A method of inhibiting the decarburization of steel by a fused salt heat treating bath, comprising adding to said bath a non-metallic organic nitrogen compound which is not explosive under the conditions of the process.

26. A method of inhibiting the decarburization of steel by a fused salt heat treating bath containing an alkaline earth metal salt comprising adding to said bath a solid polymer of hydrocyanic acid.

27. A fused salt heat treating bath, to which a non-metallic organic nitrogen compound which is not explosive under the conditions of the process has been added in amounts sufficient to inhibit decarburizing.

28. A fused salt heat treating bath, to which has been added a solid polymer of hydrocyanic acid in amounts sufficient to inhibit decarburizing.

DONALD A. HOLT.